(12) United States Patent
Rose (10) Patent No.: US 9,710,420 B2
(45) Date of Patent: Jul. 18, 2017

(54) SYSTEM AND METHOD FOR IMPROVING THE EFFICIENCY OF A SERIAL INTERFACE PROTOCOL

(71) Applicant: OCZ Storage Solutions, Inc., San Jose, CA (US)

(72) Inventor: Philip David Rose, Islip (GB)

(73) Assignee: Toshiba Corporation, Tokyo (JP)

( * ) Notice: Subject to any disclaimer, the term of this patent is extended or adjusted under 35 U.S.C. 154(b) by 431 days.

(21) Appl. No.: 14/550,829

(22) Filed: Nov. 21, 2014

(65) Prior Publication Data

US 2016/0147706 A1 May 26, 2016

(51) Int. Cl.
*G06F 13/42* (2006.01)
*G06F 13/40* (2006.01)
*H04L 12/26* (2006.01)

(52) U.S. Cl.
CPC ...... *G06F 13/4282* (2013.01); *G06F 13/4022* (2013.01); *H04L 43/062* (2013.01); *G06F 2213/0032* (2013.01)

(58) Field of Classification Search
CPC .............. H04L 43/062; G06F 13/4022; G06F 13/4282; G06F 2213/0032
See application file for complete search history.

(56) References Cited

U.S. PATENT DOCUMENTS

| | | | |
|---|---|---|---|
| 7,171,525 B1 * | 1/2007 | Norman | G06F 3/0622 711/149 |
| 8,036,314 B2 * | 10/2011 | Faulhaber | H04L 25/0274 375/316 |
| 9,100,168 B2 * | 8/2015 | Itoh | H04L 1/0002 |
| 2010/0088435 A1 * | 4/2010 | Abe | G06F 13/385 710/33 |

* cited by examiner

*Primary Examiner* — Eric Oberly
(74) *Attorney, Agent, or Firm* — White & Case LLP (57) ABSTRACT

A link layer of a serial protocol is modified to perform early primitive detection. An early primitive detector unit compares an undecoded bit sequence to that corresponding to a particular primitive. A primitive notification is generated in response to identifying a match. Latency is reduced compared with performing link layer decoding and then identifying primitives.

25 Claims, 6 Drawing Sheets

SYSTEM AND METHOD FOR IMPROVING THE EFFICIENCY OF A SERIAL INTERFACE PROTOCOL

FIELD OF THE INVENTION

The present invention is generally related to improving the efficiency of a serial protocol interface, such as a Serial Advanced Technology Attachment (SATA) bus interface.

BACKGROUND OF THE INVENTION

A serial interface protocol, such as the SATA protocol, can have more signaling latency than desired. One aspect of the signaling latency in the SATA protocol is associated with the latency to process link layer primitives, such as processing the X_RDY and R_RDY primitives. In the SATA protocol, there is an exchange of information between a host and the device through Frame Information Structures (FIS). Each FIS includes a group of Dwords. SATA utilizes primitives for control purposes and also to provide status information. Each primitive is also made up of one Dword. The primitives are also used to perform handshaking between a host and a device.

The SATA specification defines a physical layer, a link layer, and a transport layer. The physical layer defines electrical and physical characteristics. The physical layer (PHY) includes a transmit and receive pair. The physical line encoding system uses 8b/10b encoding. After the physical layer has established a link, the link layer is responsible for transmission and reception of Frame Information Structures (FIS) over the SATA link. The FIS packets contain control information or payload data. The link layer additionally manages the flow control for the link The transport layer acts on the frame, and transmits and receives frames in an appropriate sequence.

The signals in the SATA cable are arranged in 2 pairs—one pair for transmit data (TX+ & TX−), the other for receive data (RX+ & RX−). The serial data stream is capable of transmission at 1.5, 3.0 and 6.0 GT/s (Giga transfers/sec).

In a SATA interface, the binary data is encoded using the commonly known 8b/10b encoding. This is where, as the name suggests, 8 bits of data are converted to 10 bit symbols for transmission. There are two main reasons for doing this, the first is to maintain the DC balance of the transmitted signal, and the second is to ensure continuous bit transitions in order to recover a clock from the received signal. The DC balance is achieved by having the difference between the number of transmitted '1's and number of transmitted '0's (a figure termed the 'disparity') in any sequence of 20 bits or more not exceed two, also the number of '1's or '0's in a row may not exceed 5.

According to the above, the result is that the long term ratio of '2's to '0's tends towards exactly 50% and at the end of each symbol. The difference (disparity) is either +1 or −1.

Figure 1:
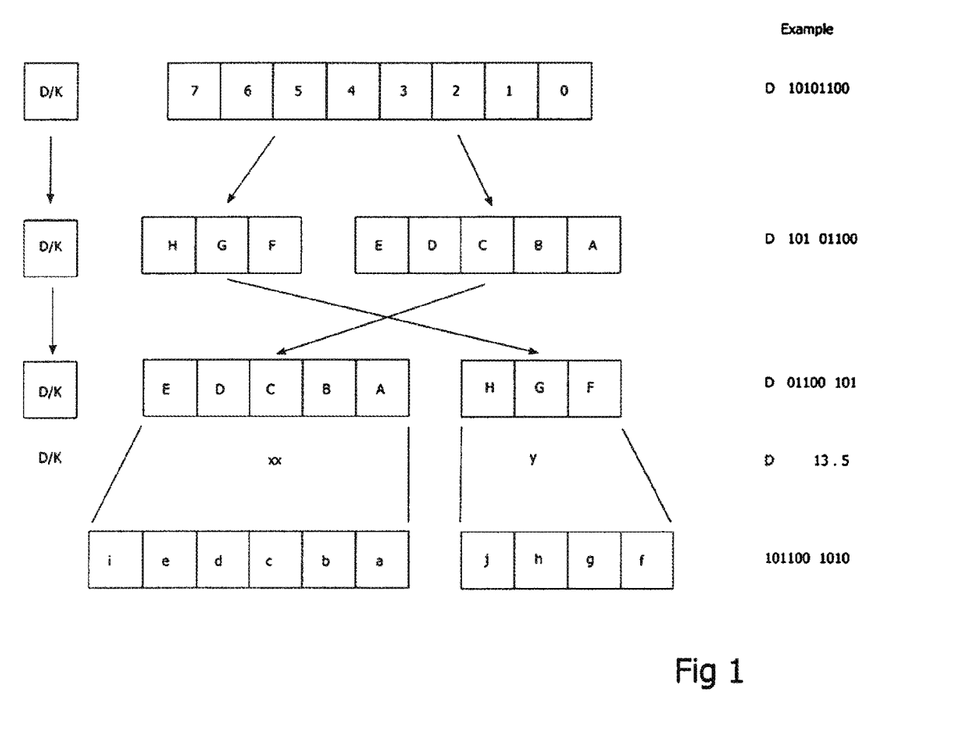
FIG. 1 illustrates aspects of SATA encoding in accordance with the prior art.

FIG. 1 illustrates aspects of the encoding of a SATA interface. As shown in FIG. 1, the 8 information bits (conventionally labeled A, B, C, and D . . . to H) plus a control variable Z (Z has the value D if the information byte is a data byte, or K if the information byte is a control character byte). The lower 5 bits of the data E-A are grouped together, and the top 3 bits H-F are separately grouped. Then, the groupings are interchanged so that bits E-A become the most significant, and the bits H-F the least significant. The encoding is now in the form Zxx.y (xx=decimal form of EDCBA; and y is a decimal form of HGF). Now the data is transformed, with the top 5 bits E-A transformed into a 6 bit symbol and 3 bits H-F into a 4 bit symbol, to form the complete 10 bit symbol, with bits a, b, c . . . h, i, j in the order they are transmitted (least significant first).

Each of the individual 6 and 4 bit codes has either equal '1's and "0's (zero disparity), but since there are not enough of these codes available, some codes either have 1 excess '1's or 1 excess '0's (disparity of +2 and −2 respectively). Which code is chosen depends on the current value (prior to the sending of this symbol) of running disparity, which starts at an initial −1. If the current value is −1, the symbol with +2 disparity is chosen; if the current value is +1, the symbol with −2 disparity is chosen. This means that the running disparity at any time will either be −1 or +1 (given that symbols with disparity of 0 can also appear in the stream).

The following table shows the allocation of 6 bit code symbols:

TABLE 5b/6b

| Input | | RD = −1 | RD = +1 | Input | | RD = −1 | RD = +1 |
|---|---|---|---|---|---|---|---|
| | EDCBA | abcdei | | | EDCBA | abcdei | |
| D.00 | 00000 | 100111 | 011000 | D.16 | 10000 | 011011 | 100100 |
| D.01 | 00001 | 011101 | 100010 | D.17 | 10001 | 100011 | |
| D.02 | 00010 | 101101 | 010010 | D.18 | 10010 | 010011 | |
| D.03 | 00011 | 110001 | | D.19 | 10011 | 110010 | |
| D.04 | 00100 | 110101 | 01010 | D.20 | 10100 | 001011 | |
| D.05 | 00101 | 101001 | | D.21 | 10101 | 101010 | |
| D.06 | 00110 | 011001 | | D.22 | 10110 | 011010 | |
| D.07 | 00111 | 111000 | 000111 | D.23 | 10111 | 111010 | 000101 |
| D.08 | 01000 | 111001 | 000110 | D.24 | 11000 | 110011 | 001100 |
| D.09 | 01001 | 100101 | | D.25 | 11001 | 100110 | |
| D.10 | 01010 | 010101 | | D.26 | 11010 | 010110 | |
| D.11 | 01011 | 110100 | | D.27 | 11011 | 110110 | 001001 |
| D.12 | 01100 | 001101 | | D.28 | 11100 | 001110 | |
| D.13 | 01101 | 101100 | | D.29 | 11101 | 101110 | 010001 |
| D.14 | 01110 | 011100 | | D.30 | 11110 | 011110 | 100001 |
| D.15 | 01111 | 010111 | 101000 | D.31 | 11111 | 101011 | 010100 |
| | | | | K.28 | 11100 | 001111 | 110000 |

The following table shows the allocation of 4 bit code symbols:

TABLE 3b/4b

| Input | RD = −1 | RD = +1 | Input | RD = −1 | RD = +1 |
|---|---|---|---|---|---|
| | HGF | fghj | | HGF | fghj |
| D.xx.0 | 000 | 1011 0100 | K.xx.0 | 000 | 1011 0100 |
| D.xx.1 | 001 | 1001 | K.xx.1 | 001 | 0110 1001 |
| D.xx.2 | 010 | 0101 | K.xx.2 | 010 | 1010 0101 |
| D.xx.3 | 011 | 1100 0011 | K.xx.3 | 011 | 1100 0011 |
| D.xx.4 | 100 | 1101 0010 | K.xx.4 | 100 | 1101 0010 |
| D.xx.5 | 101 | 1010 | K.xx.5 | 101 | 0101 1010 |
| D.xx.6 | 110 | 0110 | K.xx.6 | 110 | 1001 0110 |
| D.xx.P7 | 111 | 1110 0001 | | | |
| D.xx.A7 | 111 | 0111 1000 | K.xx.7 | 111 | 0111 1000 |

The control symbols are chosen as 10 bit symbols which are valid code symbols but which do not have a corresponding 8 bit data byte.

The link layer handles the protocol for sending and receiving data payloads and the encapsulation of data. Data bytes Dxx.y are encoded using 8b/10b as described above and link layer primitives are used to control the sending and receiving of data. These primitives are 4 bytes (a DWord of 32 bits) and all start with the control character K28.3, except for the ALIGN primitive which starts with K28.5. Data is sent in frames in a Frame Information Structure (FIS). A request to send an FIS is initiated by sending the X_RDY primitive, and once the receiver decodes and recognizes this primitive it responds with R_RDY to indicate it is ready to receive the frame, which, when the originator decodes and recognizes its receipt, proceeds to the next phase of the protocol.

Figure 2:
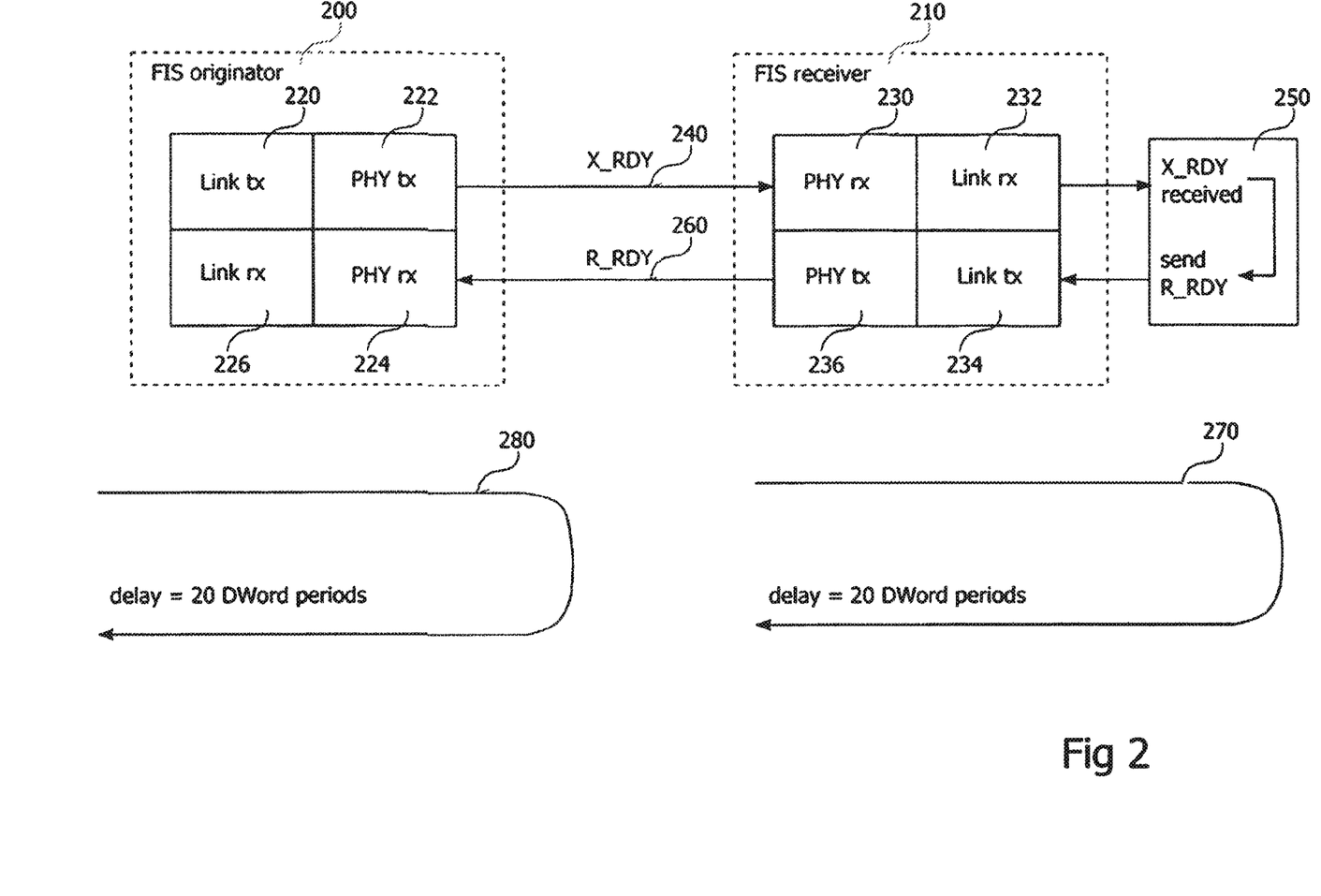
FIG. 2 illustrates primitives being exchanged over a SATA interface in accordance with the prior art.

FIG. 2 illustrates aspects of performing FIS transfers over a SATA interface. For each FIS transfer therefore, there is a latency associated with sending each FIS as shown in FIG. 2. At the FIS originator 200, prior to the FIS being sent, the X_RDY primitive is prepared by the link layer transmit section 220, then passed to the transmit physical layer 222 and through the cable transmit pair 240 to the FIS receiver 210. The signal is received through the physical layer 230 and deserialized and passed to the receive link layer 232 where 8b/10b decoding, descrambling and error checking performed before being handled by the link layer protocol state machine 250. This recognizes the receipt of X_RDY which causes the state machine to respond and send the R_RDY primitive. This passes through the transmit link 234 and PHY 236 layers through the cable pair 260 where the FIS originator performs the reciprocal receive PHY 224 and link layer 226 processing to deserialize then performs 8b/10b decoding, descrambling, and error checking before the R-RDY is finally recognized and the FIS transfer may proceed. The in/out latency at the receiving end 270 is of the order of 20 DWord time periods and a similar out/in latency 280 at the FIS originator.

For each data transfer, there are 5 separate FIS transfers involved in the SATA protocol:
 1. Host to Device FIS (command)
 2. Device to Host FIS (accept)
 3. DMA Setup FIS (start data transfer)
 4. Data transfer FIS (read or write data dwords)
 5. Set Device Bits FIS (report status)

It is possible that the status reports may be aggregated, such that one set of device bits FIS can report the status for some number N of separate data transfers. This reduces the overhead to 4 FIS transfers plus a fraction of an FIS transfer (shared between the aggregated transfers) per data transfer.

Figure 3:
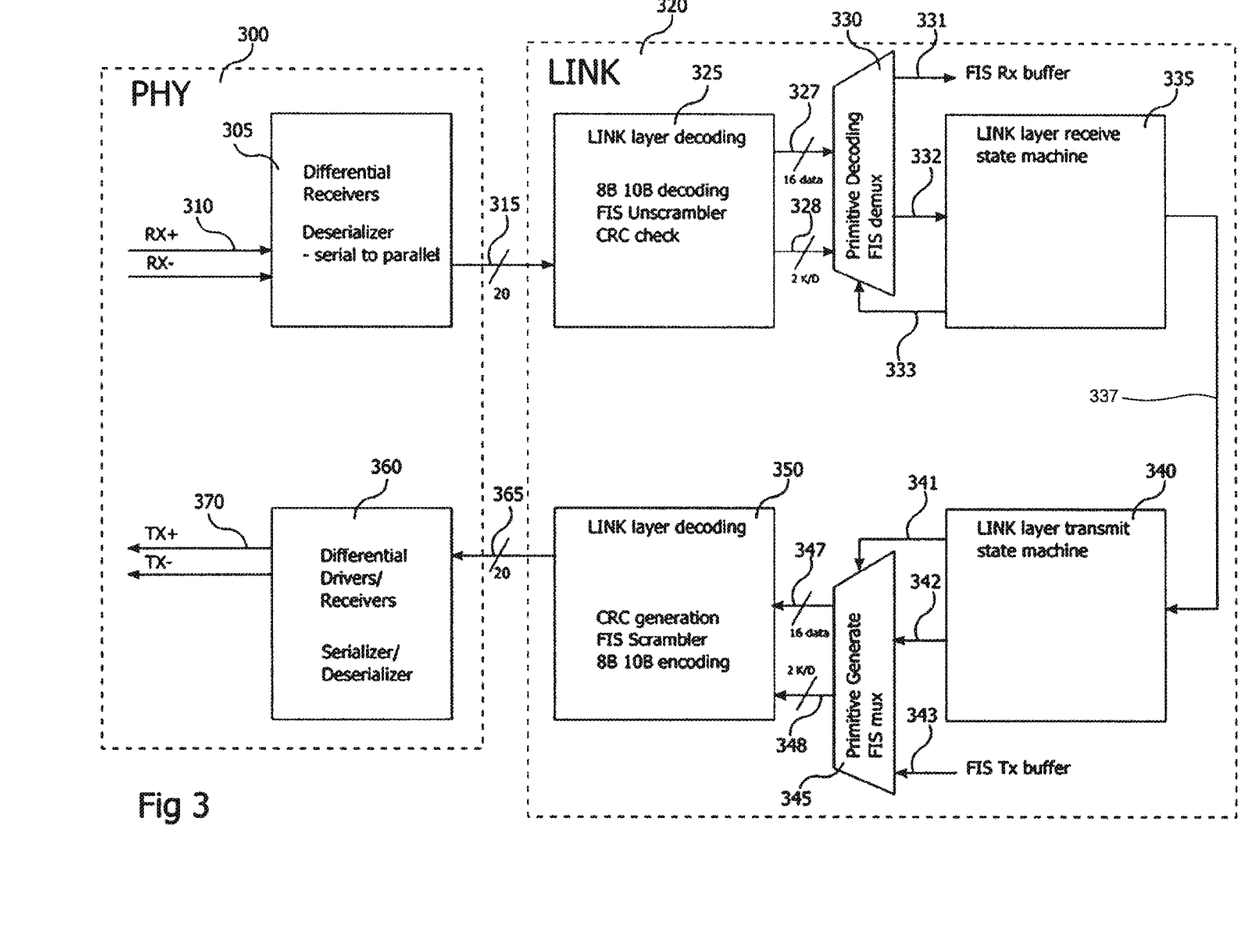
FIG. 3 illustrates aspects of the physical (PHY) and link layers of a SATA interface in accordance with the prior art.

FIG. 3 shows the basic operation of a SATA PHY (physical) 100 and link layer in the processing of FIS transfers. The basic operation is shown of a SATA PHY (physical) layer 300 and link layer 320 in the processing of FIS transfers. Incoming data from the serial cable link on the RX− and RX+ differential signals 310 is passed to differential receivers and is then converted from serial to parallel in the deserializer 305. The resulting 20 bit parallel data 315 is passed to the link layer 320 where 8b/10b decoding, FIS data unscrambling and CRC checking are performed 325. The 16 bit parallel data 327 with associated K code/Data indicator bits 328 are fed to a demultimplexer 330 where primitives 332 are separated from FIS frames 331. The FIS frames are sent to a receive buffer, and the primitives 332 to the receive state machine 335, which controls 333 the operation of demultiplexing.

Outgoing data is sent under the control of the transmit state machine 340 which multiplexes 345 the FIS frames 343 from the transmit buffer and primitives 342 from the state machines under control 341 of the state machine. The multiplex parallel data 347 and K code/Data indicator bits 348 are passed to link layer encoding 350, where CRC bits are generated, FIS frame data is scrambled and 8b/10b encoding is applied. The resultant 20 bit parallel data 365 is passed to the PHY serializer and differential driver 360 where the data is serialized and sent to differential drivers to the transmit differential pair TX− and TX+ 370 on the serial cable link.

As previously discussed, a SATA interface has a large signaling latency. Each FIS transfer suffers this signaling latency. The in/out latency at the receiving end is of the order of 20 DWord time periods and a similar out/in at the FIS originator. Attempts to reduce this latency in the prior art are unsatisfactory and not compatible with commercial applications that require robustness.

In many commercial applications, signaling latency cannot be reduced at the cost of eliminating features of the SATA interface that are required for robustness. For example, US 2004/0010625 to Lo et al. (hereinafter "Lo"), describes a method to reduce latency by using a fixed pattern generator in the physical layer. As described in the Abstract of Lo, a physical layer controller directly returns the primitive formats to an output device without sending or receiving the primitive formats to the link layer. The approach of Lo suffers from several drawbacks, including the fact that it renders inoperative features of a SATA interface required to have a robust connection.

In Lo, the link layer is not kept informed about the primitives received or transmitted, such that the interface of Lo is not able to correctly handle any errors or abnormal conditions such as the sending of a reset by the originator to abort the transfer. If an out of sequence response occurs, such as a reset, the approach of Lo will cause the SATA protocol to fail as the link layer is not tracking the state of the communication protocol, and thus not implementing the state changes required for robust communications. This can result in a complete break in communications, which in unacceptable in most commercial applications.

Therefore, in view of these problems in the prior art, an improved technique to reduce latency while permitting the detection and handling of errors and abnormal conditions was developed.

SUMMARY OF THE INVENTION

An apparatus, system, and method are disclosed to reduce signaling latency in a serial interface, such as a SATA interface. Early primitive detection is performed in a link layer based on comparing undecoded bit sequences against the undecoded bit sequences of primitives of interest. The comparison is preferably performed in hardware to reduce detection time. An early warning that a primitive has been detected is provided to a link state machine, such as a link layer receive state machine. The link layer state machine also receives in parallel the output of a link layer decoding unit. The link layer state machine(s) of the link layer thus implements the state changes of the serial interface protocol required for robustness, but with reduced latency for acting on received primitives.

DETAILED DESCRIPTION

Figure 4:
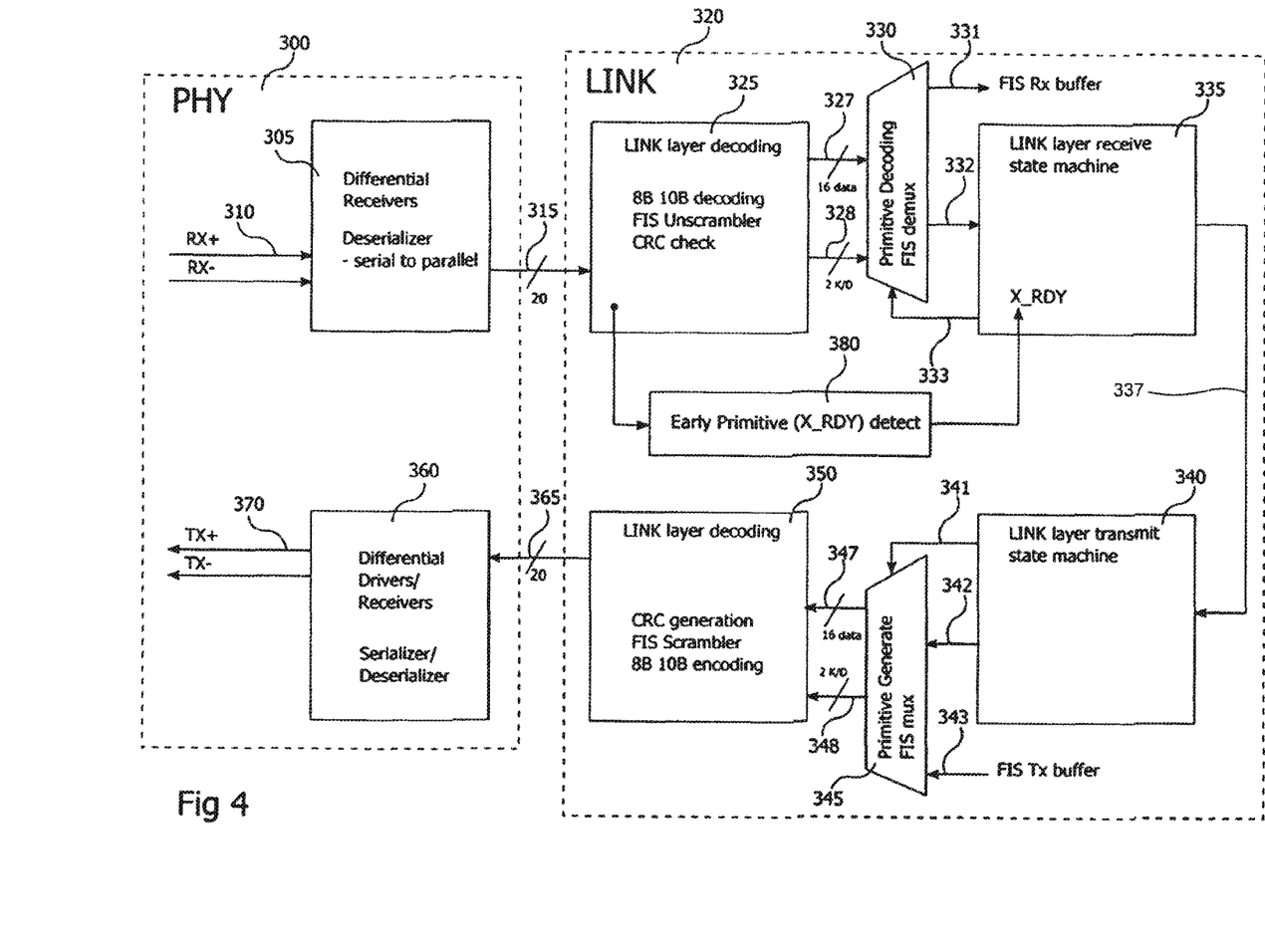
FIG. 4 illustrates a serial interface having early primitive detection provided to a link layer state machine in accordance with an embodiment of the present invention.

FIG. 4 illustrates enhanced operation of a SATA interface including a SATA PHY (physical) layer 300 and link layer 320 by supporting early primitive detection in the processing of FIS transfers in accordance with an embodiment of the present invention. The link layer 320 of the SATA interface may be implemented as part of a SATA controller circuit or as a portion of an Application Specific Integrated Circuit (ASIC). The PHY layer 300 may also be disposed on the same controller circuit or ASIC, depending on implementation.

The basic operation of SATA PHY (physical) layer 300 and link layer 320 in the processing of FIS transfers is illustrated and is similar to conventional approaches aside from utilizing an early detection of primitives in the link layer, where the primitives are defined by the SATA protocol and serve functions such as control, status, and handshaking functions. Incoming data from the serial cable link on the RX− and RX+ differential signals 310 is passed to differential receivers and then converted from serial to parallel in the deserializer 305. The resulting 20 arallel data 315 is passed to the link layer 320 where 8b/10b decoding, FIS data unscrambling and CRC checking are performed by link layer decoding unit 325. The 16 bit parallel data 327 with associated K code/Data indicator bits 328 are fed to a de-multiplexer 330 where primitives 332 are separated from FIS frames 331. The FIS frames are sent to a receive buffer and the primitives 332 are sent to the link layer receive state machine 335 which controls 333 the operation of demultiplexing.

Outgoing data is sent under the control of the link layer transmit state machine 340 which multiplexes 345 the FIS frames 343 from the transmit buffer and primitives 342 from the state machines under control 341 of the link layer transmit state machine 340. The multiplex parallel data 347 and K code/Data indicator bits 348 are passed to link layer encoding 350 where CRC bits are generated, FIS frame data is scrambled and 8b/10b encoding applied. The resultant 20 bit parallel data 365 is passed to the PHY serializer and differential driver 360 where the data is serialized and sent to differential drivers to the transmit differential pair TX− and TX+ 370 on the serial cable link An early primitive detect unit 380 is included to perform early detection of primitives of interest by examining the bit sequences prior to decoding (e.g., 8b/10b decoding, FIS unscrambling, and CRC check) by link layer decoding unit 325. In one embodiment, the early primitive detect unit 380 is implemented in hardware specifically adapted to minimize detection time, although more generally firmware might be used in some alternate embodiments. The early primitive detect unit 380 has a data connection to monitor the undecoded bit sequence entering the link layer decoding unit 325 and generates an early primitive detection signal that it provides to the link layer receive state machine 335.

As illustrative examples, the early primitive detection module may include hardware to detect any set of SATA primitives of interest such as:

X_RDY, R_RDY, R_OK, SYNC and ALIGN, CONT.

In one embodiment, the early primitive detection is performed by examining 40 bits in sequence and doing a direct compare against specific 40 bit sequences corresponding to particular primitives of interest. The link layer receive machine 335 is notified that a primitive of interest has been detected and then advances to its next state based on the detected primitive.

In one embodiment, the early detection is performed by the early primitive detect unit 380 by examining raw 40 bit sequences of four 10 bit characters before (and in parallel to) the 10b/8b decoding to 8 bit bytes. In response to early detection primitives of interest, such as X_RDY, a notification is provided to the link layer receive state machine 335 in order that that the link layer receive state machine 335 may proceed to the next state where a response R_RDY 337 is passed to the transmit state machine 340.

As an illustrative example, consider an X_RDY primitive. The X_RDY primitive consists of the following sequence of characters: K28.3 D21.5 D23.2 D23.2 (in transmission BYTE order 0,1,2,3). Depending on the state of Running Disparity at the time of starting to transmit X_RDY, the characters may have different forms, for example K28.3 can be "001111 0011" or "110000 1100"; D21.5 can (only) be "101010 1010"; D23.2 can be "111010 0101" or "000101 0101".

A full 40 bit sequence of X_RDY can therefore be one of two forms (in transmission byte order 0,1,2,3):
"001111 0011 101010 1010 000101 0101 111010 0101" or
"110000 1100 101010 1010 111010 0101 000101 0101"

By detection of these specific bit sequences by the early primitive detection unit 380, the X_RDY primitive can be detected before (but in parallel to) the 10b/8b decoding and FIS/primitive separation taking place.

While embodiments of the invention have been described for the purposes of describing the invention as having a link layer receive state machine and a separate link layer transmit state machine it will be understood that this may also be considered to be equivalent to a single link layer protocol state machine performing all of the state functions to receive and transmit.

Figure 5:
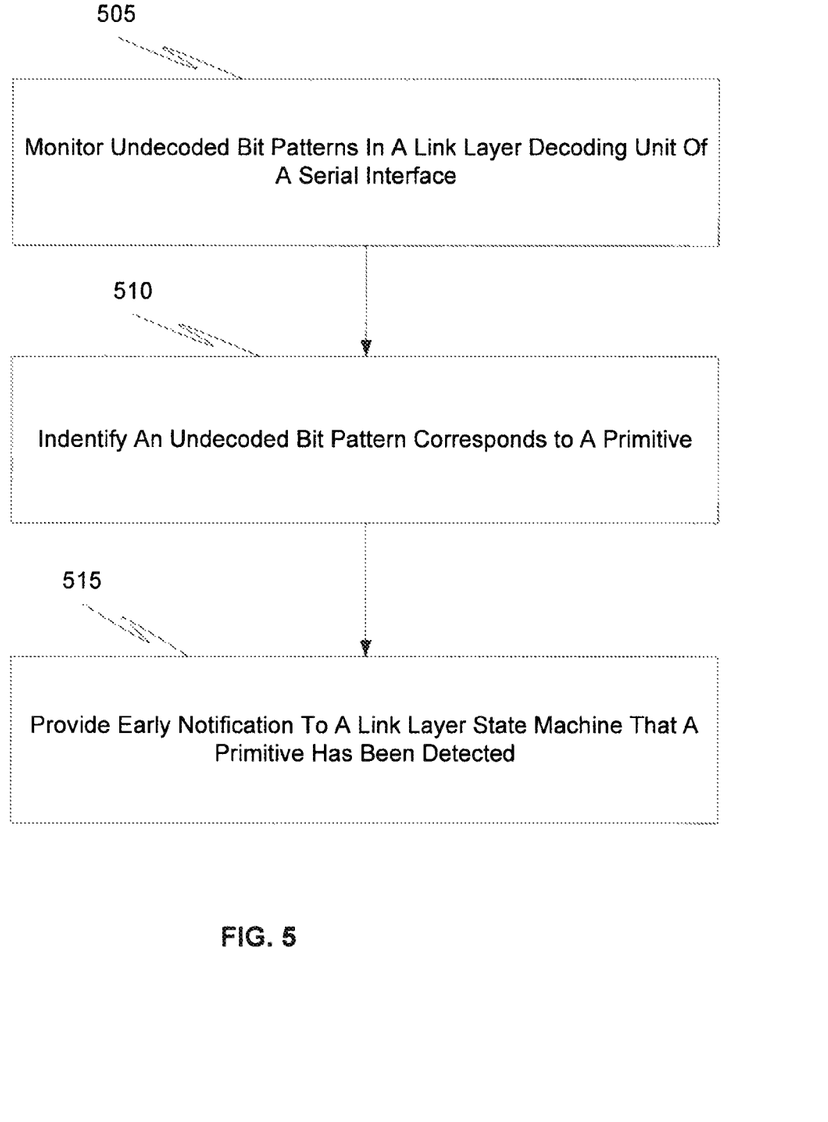
FIG. 5 is a flow chart of a method of performing early primitive detection in a link layer in accordance with an embodiment of the present invention.

FIG. 5 is a flowchart of a method in accordance with an embodiment of the present invention. Undecoded bit patters are monitored in a link layer decoding unit of a serial interface in block 505. A determination is made whether the undecoded bit pattern corresponds to a primitive in block 510. Early notification is provided to a link layer state machine that a primitive has been detected in block 515.

Figure 6:
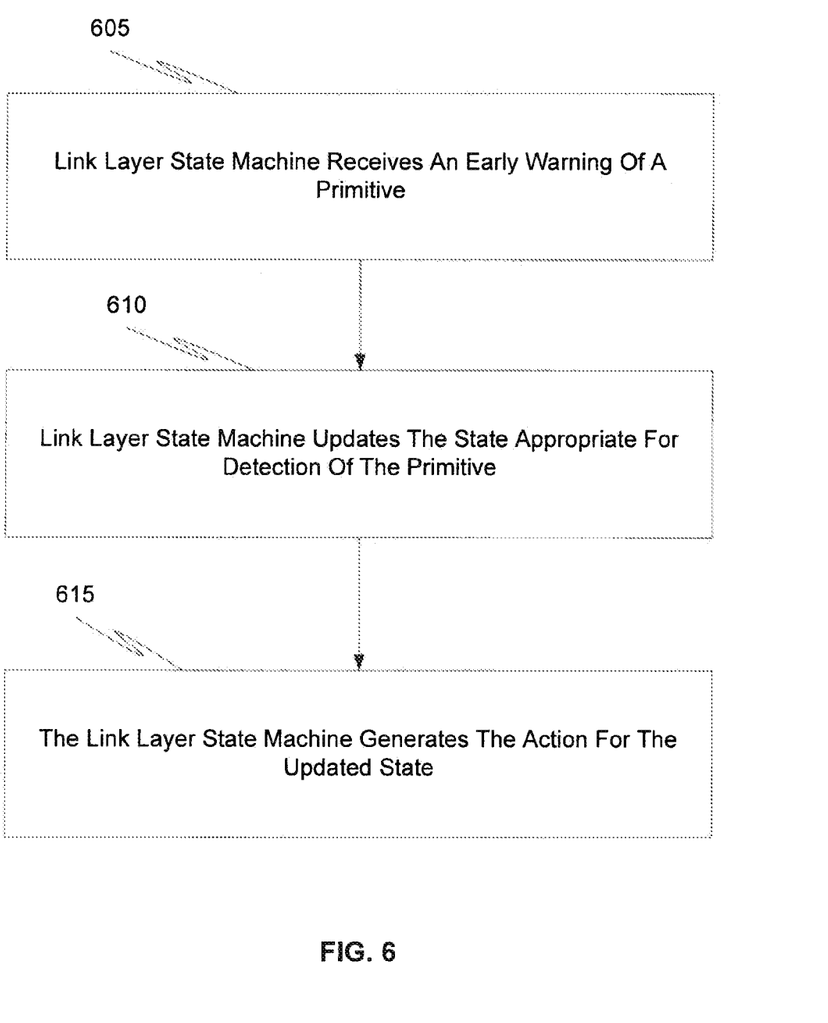
FIG. 6 illustrates actions of a link layer state machine receiving early primitive detection in accordance with an embodiment of the present invention.

FIG. 6 is a flowchart illustrating actions occurring in a link layer state machine in accordance with an embodiment of the present invention. The link layer state machine receives an early warning of a primitive in block 605. The link layer state machine updates its state to the next state appropriate for the detected primitive in block 610. This may result in the link layer state machine generating the action for the updated state in block 615, such as generating a R_RDY response for an X_RDY primitive.

One aspect of the present invention is that the early primitive detection works in parallel with the regular non-accelerated primitive detection, but does not otherwise interfere with the operation of the link layer and its state machine, which continues to operate as in a wholly non-accelerated link layer. This is because the primitives that are subject to the early detection mechanism are only those primitives that are normally repeated by the sender as part of the normal operation of the SATA protocol (e.g., the sender repeatedly sends the same primitive until the receiver responds and the sender receives the expected response). That is, in one embodiment the early detection is performed on any one of a set of SATA primitives that are ordinarily repeated by the sender.

In normal (non-accelerated) operation, the link layer receive state machine 335 only changes state and responds to the first of these repeated primitives and will ignore the rest. Early detection of the repeated primitive therefore causes the link layer receive state machine 335 to change state and respond correctly as in normal operation. Shortly afterwards, the link layer receive state machine 335 receives the detected primitive via the regular detection path from the link layer decoding unit 325, but the link layer receive state machine 335 will treat this just as if it was the next repeated primitive. As a result, the link layer receive state machine 335 behaves normally until eventually the sender has received its correct response and the sender changes state and proceeds to send the next primitive of the next phase of the protocol. Early detection of repeated primitives can therefore be done without any changes being made to the operation of the link layer receive state machine 335, aside from providing the additional notification from the early primitive detect unit 380.

At the start and end of transmission and reception of an FIS there are repeated characters in the data stream to synchronize the two link state machines (in the host and device). The fact that these characters are repeated allows the operation of the link layer receive state machine 335 to be accelerated with early decoding of these repeated handshake primitives. In the non-error case, these are always repeated until the corresponding repeated response character is received from the link partner. In an error scenario, such as SYNC escape (a method of the transmitter to abort FIS transmission), it is perfectly valid under the SATA protocol to send a SYNC escape at any point, so early detection of primitives does not affect the operation if the SYNC character were to be acted upon before or after the receiver link had transmitted R_RDY for example. In the present invention, early detection of non-repeated primitives is not performed to avoid corrupting the SATA protocol.

For example, Table 1 shows an example of the normal, non-accelerated operation of the protocol:

TABLE 1

(Conventional Primitive Detection)

| DWORD | HOST | DEVICE | Comment |
| --- | --- | --- | --- |
| 0 | SYNC | SYNC | |
| 1 | X_RDY | SYNC | Start of 5 DWORD FIS transmit |
| 2 | X_RDY | SYNC | |
| 3 | X_RDY | SYNC | |
| 4 | X_RDY | SYNC | |
| 5 | X_RDY | SYNC | |
| 6 | X_RDY | R_RDY | Device responds to X_RDY after 5 DWORD latency |
| 7 | X_RDY | R_RDY | |
| 8 | X_RDY | R_RDY | |
| 9 | X_RDY | R_RDY | |
| 10 | X_RDY | R_RDY | |
| 11 | SOF | R_RDY | Host can start transmit after 5 DWORD latency |
| 12 | DATA #0 | R_RDY | |
| 13 | DATA #1 | R_RDY | |
| 14 | DATA #2 | R_RDY | |
| 15 | DATA #3 | R_RDY | |
| 16 | DATA #4 | R_IP | Device responds to SOF after 5 DWORD latency |
| 17 | CRC | R_IP | |
| 18 | EOF | R_IP | |
| 19 | W_TRM | R_IP | |
| 20 | W_TRM | R_IP | |
| 21 | W_TRM | R_IP | |
| 22 | W_TRM | R_IP | |
| 23 | W_TRM | R_IP | |
| 24 | W_TRM | R_OK | Device responds to EOF after 5 DWORD latency |
| 25 | W_TRM | R_OK | |
| 26 | W_TRM | R_OK | |
| 27 | W_TRM | R_OK | |
| 28 | W_TRM | R_OK | |
| 28 | SYNC | R_OK | Host responds to R_OK after 5 DWORD latency |
| 30 | SYNC | R_OK | |
| 31 | SYNC | R_OK | |
| 32 | SYNC | R_OK | |
| 33 | SYNC | R_OK | |
| 34 | SYNC | SYNC | Device responds to SYNC after 5 DWORD latency |

The example of table 1 shows a total host transmit and device receive latency of 5 DWORD periods, while in a real system the latency of host or device can be up to 24 DWORD periods (which is the maximum allowed latency in the SATA Version 3 specification). Additionally, in the example of table 1, no ALIGN characters were required during this period (they are normally sent in pairs every 256 DWORDs) and neither host nor device is performing CONT scrambling of primitives.

The SATA primitives relevant here in the example of Table 1 are as follows:

SYNC—idle character & FIS abort flag
X_RDY—transmitter ready
R_RDY—receiver ready
SOF—Start of FIS
DATA #N—Byte N of data payload
CRC—Cyclic redundancy check
EOF—End of FIS
W_TRM—Transmit wait handshake
R_OK—FIS received OK
R_IP—FIS reception in progress At DWORD 1, the host transmits the first X_RDY primitive. The host continues to send X_RDY and the device continues to send SYNC characters until, at DWORD 6, the device decodes and detects the first sent X_RDY and sends the first R_RDY.

The host continues to send X_RDY and the device continues to send R_RDY characters until, at DWORD 11, the host decodes and detects R_RDY and responds with SOF. The device continues to send R_RDY until, at DWORD 16, it decodes and detects SOF and responds with R_IP. It can be seen that SOF is not being repeated by the host and therefore it is not possible to provide early detection of SOF without subjecting the state machine to an invalid SOF (early detect) plus SOF (normal detect) sequence.

The host concludes the data and CRC transmits by sending EOF at DWORD 18, which the device decodes and detects at DWORD 24 and responds by sending R_OK (assuming the data and CRC are received correctly).

The host decodes and detects R_OK at DWORD 28 and responds by repeatedly sending SYNC. The device decodes and detects SYNC at DWORD 34 and responds by sending SYNC.

Thus, the total elapsed time for a normal FIS transfer is 34 DWORD periods. This assumes that the primitive decode and detect latency is 5 DWORD periods. In an actual system it will be much more and the latency can be as high as 48 DWORD periods in total.

Now consider a system where early primitive detection is implemented for the repeated primitive X_RDY, R_RDY, SYNC, R_OK and W_TRM. In order to detect these primitives in the 10b encoded format, it is also necessary to detect ALIGN and CONT, to determine the primitive in force at the time (the behavior of ALIGN and CONT is described in the SATA version 3.2 specification). Table 2 shows the sequence of sending and receiving of primitives for a single FIS.

TABLE 2

(Early Primitive Detection For Repeated Primitives)

| DWORD | HOST | DEVICE | Comment |
|---|---|---|---|
| 0 | SYNC | SYNC | |
| 1 | X_RDY | SYNC | Start of 5 DWORD FIS transmit |
| 2 | X_RDY | SYNC | |
| 3 | X_RDY | SYNC | |
| 4 | X_RDY | R_RDY | Device responds to X_RDY after 3 DWORD latency |
| 5 | X_RDY | R_RDY | |
| 6 | X_RDY | R_RDY | |
| 7 | SOF | R_RDY | Host can start transmit after 3 DWORD latency |
| 8 | DATA #0 | R_RDY | |
| 9 | DATA #1 | R_RDY | |
| 10 | DATA #2 | R_RDY | |
| 11 | DATA #3 | R_RDY | |
| 12 | DATA #4 | R_RDY | |
| 13 | CRC | R_RDY | |
| 14 | EOF | R_IP | Device responds to SOF after 5 DWORD latency |

TABLE 2-continued (Early Primitive Detection For Repeated Primitives)

| DWORD | HOST | DEVICE | Comment |
|---|---|---|---|
| 15 | W_TRM | R_IP | |
| 16 | W_TRM | R_IP | |
| 17 | W_TRM | R_IP | |
| 18 | W_TRM | R_IP | |
| 19 | W_TRM | R_IP | |
| 20 | W_TRM | R_OK | Device responds to EOF after 5 DWORD latency |
| 21 | W_TRM | R_OK | |
| 22 | W_TRM | R_OK | |
| 23 | SYNC | R_OK | Host responds to R_OK after 3 DWORD latency |
| 24 | SYNC | R_OK | |
| 25 | SYNC | R_OK | |
| 26 | SYNC | SYNC | Device responds to SYNC after 3 DWORD latency |

Here we can see the device detects the first X_RDY primitive at DWORD 4, which is 2 periods earlier than the previous example. Note that the host still continues to send X_RDY as before, so the link layer receive state machine 335 is not affected by receiving extra early R_RDY primitive notifications, as it is able to handle repeated R_RDY notifications even in normal operations.

The faster detection of X_RDY in the device and R_RDY in the host means that data transmission starts at DWORD 8, 4 periods earlier that the previous example.

With the early detection of repeated primitives (in 3 DWORD periods in this example) in both host and device, the total DWORD periods elapsed in the complete FIS transfer is 26, compared to 34 in the previous example. Table 2 shows a host transmission of an FIS, a device to host transmit of an FIS is similar with the roles reversed. If only one side of the link (host or device) implements the early detection of repeated primitive, the number of DWORD time periods saved is halved.

One aspect of the present invention is that signaling latency is reduced while preserving the functions of the link layer required for robustness. The early primitive detect unit 380 is operating in the link layer parallel to the normal decoding circuitry in a serial interface. The early primitive detect unit 380 is used to detect link layer protocol primitives before the serial data is decoded and separated but does not interfere with other aspects of the link layer. For example while the link layer receives an early warning of a primitive via the early primitive detector, the link layer then behaves exactly as though it has received the primitive and behaves accordingly. The time delay due to the deserialization and 8b/10b decoding and recognition of the primitive is in parallel form is therefore saved without compromising robustness.

Consider the early detection of an X_RDY primitive. The response R_RDY 337 is still generated by the link layer receive state machine 335 and is passed to the transmit state machine 340 and is subsequently sent to the physical layer for 8b/10b encoding and serialization. This means that the link layer correctly responds to errors or abnormal conditions in the same way as if early primitive detection was not performed. For example, the opposite end of the connection could respond to a reset due to an error condition after the receiver of the X_RDY primitive has responded with an R_RDY.

The link layer is thus robustly employed in a full implementation of the SATA protocol that behaves in exactly the same manner as a system with no latency reduction scheme, with the exception that the link layer employs an 'early warning' primitive detection mechanism which reduces the delay time from the receipt of data from the physical layer to the recognition of primitives. Having recognized the primitive, the link layer protocol follows the same procedures to deal with the primitive, including forming the correct primitive response as appropriate. Additionally, this approach is robust because it is compatible with error handling and addressing abnormal conditions to avoid breaking the connection.

While embodiments of the present invention have been described in regards to a SATA implementation, it will be understood that it is contemplated that the present invention may be extended to other serial protocols relying on similar handshaking sequences and the use of protocol primitives, such as the Serial Attached SCSI (SAS) protocol, where SCSI is the Small Computer System Interface.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of reducing latency in a serial interface, comprising:
    receiving an undecoded bit sequence from a physical layer of the serial interface;
    performing link layer decoding and providing the decoded output to a link layer receive state machine;
    monitoring, in the link layer, the undecoded bit sequence and comparing the undecoded bit sequence against a specific sequence corresponding to a particular primitive of interest; and
    in response to determining that the undecoded bit sequence matches the specific bit sequence, generating an early primitive notification and providing the early primitive notification to the link layer receive state machine.

2. The method of claim 1, wherein the serial interface is a Serial Advanced Technology Attachment (SATA) interface.

3. The method of claim 2, wherein the particular primitive of interest is selected from the group consisting of X_RDY, R_RDY, R_OK, SYNC, ALIGN, and CONT.

4. The method of claim 2, wherein the particular primitive of interest is selected from at least one member of a set of repeated primitives.

5. The method of claim 2, wherein the link layer receive state machine is part of a link layer protocol state machine including a link layer transmit state machine.

6. The method of claim 1, wherein the comparing of the undecoded bit sequence and the generating of the early primitive notification is performed in hardware.

7. The method of claim 2, wherein the comparing of the undecoded bit sequence and the generating of the early primitive notification is performed in hardware.

8. The method of claim 2, wherein the comparing comprises examining 40 undecoded bits in sequence and performing a direct compare against a specific 40 bit sequence for each particular primitive of interest.

9. The method of claim 1, wherein the serial interface is a Serial Attachment SCSI (SAS) interface.

10. A Serial Advanced Technology Attachment (SATA) interface controller with reduced latency, comprising:
    a link layer including an early primitive detecting unit to monitor an undecoded bit sequence received from a physical layer, compare the undecoded bit sequence against a specific sequence corresponding to a particular primitive of interest, and in response to identifying a match, providing an early primitive notification to a link layer receive state machine.

11. The SATA interface controller of claim 10, wherein the particular primitive of interest is selected from the group consisting of X_RDY, R_RDY, R_OK, SYNC, ALIGN, and CONT.

12. The SATA interface controller of claim 10, wherein the particular primitive of interest is selected from at least one member of a set of repeated primitives.

13. The SATA interface controller of claim 11, wherein the link layer receive state machine is part of a link layer protocol state machine that includes a link layer state transmit machine.

14. The SATA interface controller of claim 11, whether the early primitive detecting unit is implemented exclusively in hardware.

15. The SATA interface controller of claim 11, wherein the early primitive detecting unit examines 40 undecoded bits in sequence and performs a direct compare against a specific 40 bit sequence corresponding to a particular primitive of interest.

16. A Serial Advanced Technology Attachment (SATA) interface controller, comprising:
    a link layer including:
        a link layer decoding unit to decode a bit sequence received from a physical layer;
        an early primitive detecting unit to monitor an undecoded bit sequence received from a physical layer and compare the undecoded bit sequence against a specific sequence corresponding to a particular primitive of interest; and
        a link layer receive state machine having a first input to receive an output of the link layer decoding unit and a second input to receive an output from the early primitive detection unit notifying the link layer receive state machine that a primitive has been detected.

17. The SATA interface of claim 16, wherein the link layer is formed in an Application Specific Integrated Circuit (ASIC).

18. The SATA interface controller of claim 16, wherein the particular primitive of interest is selected from the group consisting of X_RDY, R_RDY, R_OK, SYNC, ALIGN, and CONT.

19. The SATA interface controller of claim 16, wherein the particular primitive of interest is selected from at least one member of a set of repeated primitives.

20. A method of operating a Serial Advanced Technology Attachment (SATA) interface comprising:
receiving, in a first input to a link layer receive state machine, an output of a link layer decoding unit performing decoding of bit sequences received from a physical layer;
receiving, in a second input to a link layer receive state machine, an output of an early primitive detection unit that compares undecoded bit sequences received from the physical layer against specific undecoded bit sequences of one or more primitives and generates an early primitive notification in response to identifying a match; and
updating the state of the link layer receive state machine based on the first input and the second input.

21. The method of claim 20, wherein the particular primitive of interest is selected from the group consisting of X_RDY, R_RDY, R_OK, SYNC, ALIGN, and CONT.

22. The method of claim 20, wherein the particular primitive of interest is selected from at least one member of a set of repeated primitives.

23. A method of operating a Serial Advanced Technology Attachment (SATA) interface comprising:
monitoring, in the link layer, an undecoded bit sequence received from a physical layer and comparing the undecoded bit sequence against a specific sequence corresponding to a particular SATA primitive of interest; and
in response to determining that the undecoded bit sequence matches the specific bit sequence, generating an early primitive notification and providing the early primitive notification to a link state machine.

24. The method of claim 23, wherein the particular SATA primitive of interest is selected from the group consisting of X_RDY, R_RDY, R_OK, SYNC, ALIGN, and CONT.

25. The method of claim 23, wherein the particular SATA primitive of interest is selected from at least one member of a set of repeated primitives.

* * * * *